Dec. 23, 1958  W. R. ROYER  2,865,422
VEHICLE TIRE ANTI-SKID CHAIN AND APPLYING MEANS
Filed Feb. 15, 1956

INVENTOR.
William R. Royer
BY
Shoemaker & Mattare
ATTYS.

United States Patent Office 2,865,422
Patented Dec. 23, 1958

2,865,422

VEHICLE TIRE ANTI-SKID CHAIN AND APPLYING MEANS

William R. Royer, Kingston, Pa.; Ella Dale Royer, administratrix of said William R. Royer, deceased Application February 15, 1956, Serial No. 565,588

9 Claims. (Cl. 152—213)

This invention relates to improvements in anti-skid chains for motor vehicle tires and is directed particularly to a new and novel means for facilitating the application of the chain structure to a tire.

Anyone who has had to apply an anti-skid chain to a motor vehicle tire will appreciate the difficulties involved and with the present type of motor vehicle, where the fenders are lower over the outer sides of the tires than in times past, these difficulties are greatly increased. In the application of a tire chain to a tire, the customary practice is to drape the chain over the top of the tire, after elevating the tire and wheel from the ground, so that the ends of the side chains carrying the conventional latch hooks and the other ends of the side chains hang or dangle loosely. It is then necessary to reach over the tire to the inner side and locate the hook on the inner side chain and the free end of the same chain by feel and, then, by using both hands, manipulate the hook and the end of the inner side chain into position to effect the connection of the same together.

Another method of connecting the ends of the inner side chain of the anti-skid chain structure is to lie on the ground under the car where the hook and the end of the chain can be seen but this manner of connecting the chain ends can only be practiced where one is provided with suitable covering for the body or something to lie upon on the ground.

In the light of the foregoing, it is a particular object of the present invention to provide a new and novel anti-skid chain and applier therefor by means of which the latch hooks on the inner and outer side chains are maintained firmly in position at the inner and outer sides of the tire while the other ends of the side chains are connected to the hooks after effecting the encirclement of the tire by the chain structure.

Another object of the invention is to provide in a tire chain structure a novel means for maintaining the side chain connecting hooks in such position that the free ends of the side chains can be connected with the hooks by using one hand only thus greatly reducing the difficulty of applying the chain structure.

A still further object of the invention is to provide a novel anti-skid chain for motor vehicle tires and means for facilitating the application of the chain to the tire wherein such means is attachable to the tire casing and to the side chain carrying hooks in such a way as to maintain the hooks securely in place and in spaced relation with the adjacent sides of the tire casing so that the connection of the other ends of the side chains with the hooks may be easily and quickly accomplished.

Still another object of the invention is to provide a means for maintaining the latch hooks of a tire chain in position until the side chains are joined together and which means is then easily and quickly removed from position merely by pulling the same outwardly from the tire casing to thereby effect its disconnection from the latch hooks.

Still another object of the invention is to provide in a tire chain structure an improved hook unit and chain applier which are readily detachably coupled together for maintaining the hooks in desired position while the chain is being secured and for readily releasing the hooks after such securement of the ends of the side chains is completed.

A still further object of the invention is to provide a new and novel latch hook which is formed to facilitate the holding of any unused terminal links of the attached side chain to prevent such unused links from flapping or slipping down over the hook body and interfering with the opening and closing of the locking lever which forms a part of the conventional hook.

The invention will be best understood from a consideration of the following detailed description taken in connection with the accompanying drawing forming a part of the specification, with the understanding that the invention is not confined to a strict conformity with the drawing but may be changed or modified so long as such changes and modifications form no material departure from the salient features of the invention as expressed in the appended claims.

Figure 1:
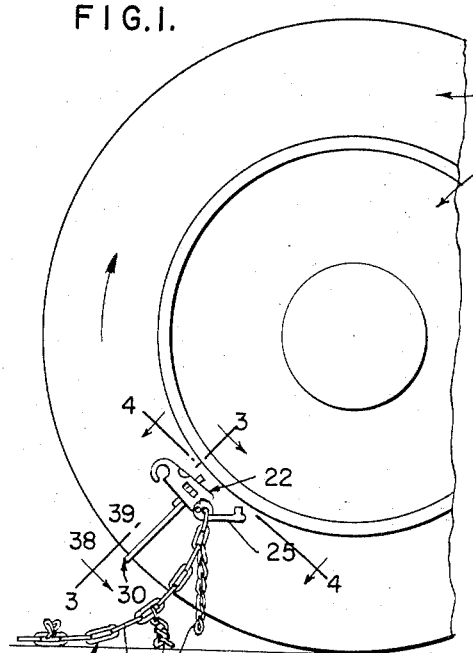
Fig. 1 is a view in side elevation of a portion of a motor vehicle wheel and tire showing one side of the chain applier and a latch hook connected thereto and held in position at the side of the tire preparatory to turning the tire for drawing the anti-skid chain into position therearound, the latch hook being shown in open position.

Referring now more particularly to the drawings, the numeral 10 generally designates a motor vehicle wheel upon which is shown a conventional tire casing 12.

The anti-skid chain with which the novel hook and applier are associated is generally designated 14 and comprises the conventional inner and outer side chains 16 and 18 respectively and the short cross connecting chains 20 between the side chains.

The numerals 21 and 22 designate generally inner and outer latch hooks by means of which the ends of the side chains are joined together in the usual or conventional manner. Since these latch hooks are of the same form or construction with the exception that they are made one in reverse of the other for inner and outer use, the description of one applies to the other and, accordingly, such description will be confined to the outer latch hook which is generally designated 22.

Each latch hook comprises an elongate flat plate body 23 at one end of which is pivotally attached at 24 an end of a locking lever 25.

Adjacent to the pivot 24 for the locking lever 25, the hook body or plate is recessed in a conventional manner as indicated at 26 and the lever 25 has the usual curled tail piece 27 in which is engaged a terminal link 28 of the outer side chain 18.

Figure 5:
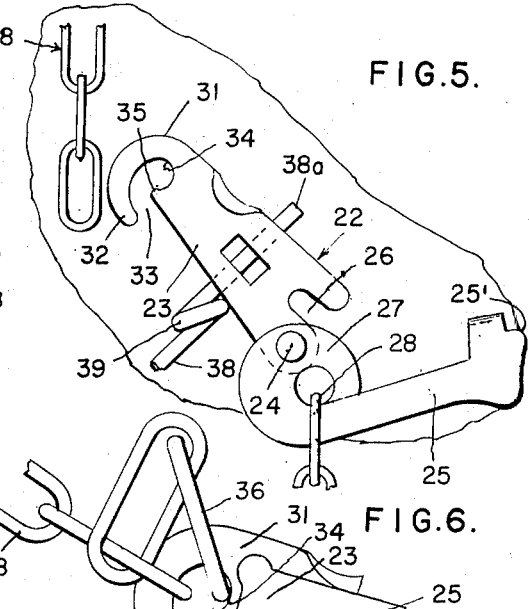
Fig. 5 is a view on an enlarged scale showing the latch hook in open condition and approximately in the position illustrated in Fig. 1 ready for the connection therewith of the free end of the side chain to the other end of which the latch hook is permanently coupled.

It will be understood, of course, that this construction and arrangement is duplicated in the hook on the opposite side, that is, the inner latch hook 21, and it will also be understood by those familiar with the art that the side chain terminal link 28 is permanently connected to the end of the lever 25 and when the lever is swung over in a counter-clockwise direction, as viewed in Fig. 5, to its locking position, the link 28 will be positioned in the recess 26 and the side chain will extend directly from the end of the latch hook in the usual manner. The body of each latch hook has formed on one side, which is the inner side of the latch hook body when the same is in position at the side of the tire casing, a loop or eye 29 which will bear against the adjacent sidewall of the tire casing as is clearly shown in Fig. 3 so as to maintain the body of the hook link in spaced relation with the casing wall. This loop or eye 29 may be formed or made a part of the latch hook body in any suitable manner and it is here shown as comprising a pressed-out part of the body 23 or, in other words, is struck from the body. It may, however, be formed as a separate element and welded or otherwise secured to the body if such a method of construction is found desirable.

The function of the loop or eye 29 will be hereinafter described in connection with the description of the chain applier which is generally designated 30.

At the opposite end of the plate 23 there is formed a hook 31, the free end 32 of which lies in the plane of the body 23 and is spaced from one edge of the body to form the entrance opening 33 for facilitating the engagement of the bill through a link at the other end of the side chain 18.

The numeral 34 designates the bottom or gullet of the hook 31 where the attached side chain link positions when the ends of the side chain are coupled together.

In conventional or known forms of latch hooks of this character, the inside of the hook bill forms merely a circular recess in which the chain link lies and where it is retained by the outer end part 25' of the locking lever 25 when the latter is in closed position.

In the present construction of the latch hook, however, the gullet 34 of the hook is extended back or generally in a longitudinal direction into the body 23 so as to provide a short finger 35 in the outer side of the gullet and at the opposite side of the entrance 33 from the end of the bill 32. This construction provides a receiver not only for the link at the free end of the side chain which establishes the connection of the free end of the side chain with the opposite end through the medium of the latch hook but it also provides additional space in which an unused terminal link may be located as, for example, the terminal link 36 shown in Fig. 6. Thus, at least two links can have the hook of the bill passed therethrough, one of which links performs the function of connecting the end of the chain with the latch hook while the other two links are merely out of service but held against flapping when the tire rotates and also being prevented from sliding down on the body of the latch hook to interfere with the upward swing of the locking lever.

The applier, which is generally designated 30, and which is formed for cooperative attachment with the latch hooks, comprises a substantially U-shaped yoke of suitable spring metal such as spring wire or the like. With this applier, the yoke may be suitably shaped to fit around the tread portion of the tire casing, it being here shown in Fig. 3 as having a central part 37 and the side arms 38. The yoke is initially formed so that the space between the side arms 38 will be considerably less than the width of the tire casing and the side arms must, therefore, be sprung outwardly to receive the tire casing. Thus, when they are released, the tendency to drawing inwardly will cause the arms to firmly grip the tire casing and thus hold the applier in position thereon.

Figure 3:
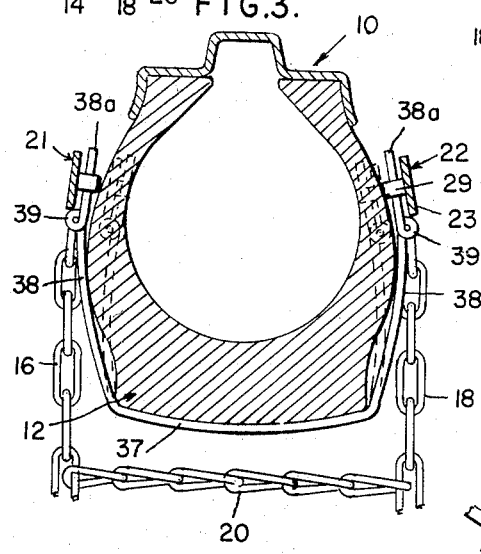
Fig. 3 is a transverse sectional view, on an enlarged scale, taken substantially on the line 3—3 of Fig. 1 illustrating the form of the applier and the manner in which it is removably attached to the tire casing and detachably coupled with the inner and outer latch hooks.
Figure 4:
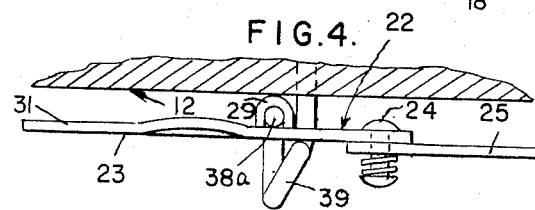
Fig. 4 is a sectional view, on an enlarged scale, taken substantially on the line 4—4 of Fig. 1 illustrating the manner in which the loop of the latch hook body maintains the hook in spaced relation with the side wall of the tire casing.

Adjacent to its free end, each of the side arms 38 carries a stop 39 which is here shown as being formed by looping a portion of the arm although such stop may be formed in any other desired manner, and the portion of the arm between the stop and the free end thereof is straight and is designed to be passed through an eye or loop 29 of a latch hook body as shown in Fig. 3. This free end portion of each arm is designated 38a.

In the use of the present invention for effecting the application of an anti-skid chain to a tire, the end portions 38a of the side arms of the applier are each inserted through an eye 29 of a latch hook with the body of the latch hook on the outer side of the arm and its inward movement thereon being stopped or arrested by the stop portion 39 as shown in Fig. 3. The applier arms are sprung apart and the applier is placed upon the tire casing so that the side chains of the anti-skid chain structure will hang down when the locking levers are in open position as shown in Fig. 1. The vehicle wheel is then rotated either by moving the vehicle forward on the ground or by turning the wheel by hand when it is jacked up from the ground so that the applier 31 will move around in the direction of the arrows in Fig. 1 and the anti-skid chain will be drawn along and around the tire in an obvious manner. After a substantially complete revolution of the wheel has been made, the applier will come back to approximately the position shown in Fig. 2 and the hanging free ends of the side chains 16 and 18 may then be connected to the latch hooks by engaging one of the terminal links over the latch hook bill.

Fig. 5 shows the approximate position of the free end of the outer side chain after the anti-skid chain has been drawn into position on the tire showing a terminal link positioned closely to the bill of the latch hook so that it may be readily grasped and slipped onto the hook after which the locking lever will be swung into closed position in the usual manner.

Figure 6:
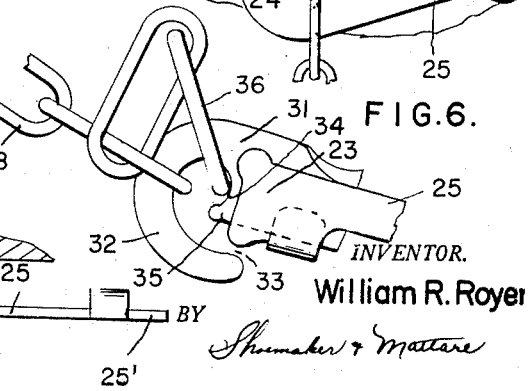
Fig. 6 is a detail view of the hook end of the latch hook body showing the manner in which unused terminal links of the side chain are retained in position on the hook bill to prevent such links from flapping or slipping down on the body of the latch hook.

It will be seen from the foregoing description that the latch hooks will be maintained at all times in spaced relation with the tire casing so that no difficulty will be experienced in connecting the free end of the side chains therewith and if after connecting the side chains with the latch hooks one or two links remain free, these can be placed on the hook bills as shown in Fig. 6 and when the lever 25 is closed, the links will be securely retained in position.

Figure 2:
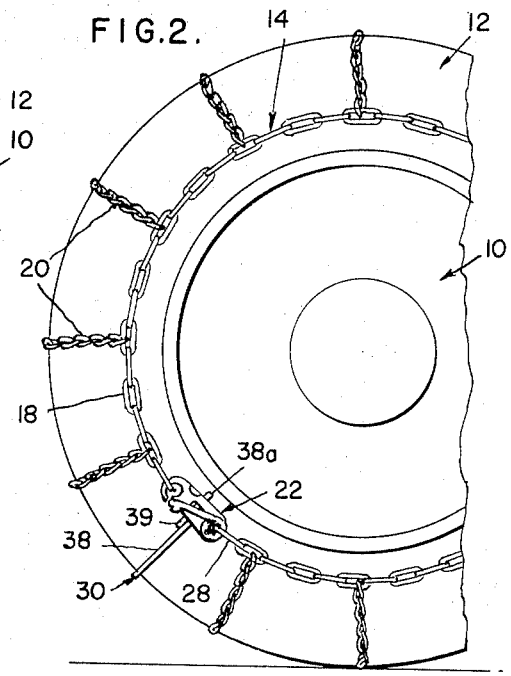
Fig. 2 is a view corresponding to Fig. 1 but showing the chain applied with the side chain securing latch hook closed and the applier ready for removal from the tire casing and detachment from the latch hooks, the outer one only of which is illustrated.

After this operation of closing the locking levers of the latch hooks is completed and the anti-skid chain is properly applied as shown in Fig. 2, the applier 30 can be easily and quickly removed by merely pulling it outwardly thereby slipping the terminal portions 38a out of the loops 29 of the latch hooks.

From the foregoing, it will be seen that there is provided by the present invention a new and novel anti-skid chain latch and applier means for the chain which permits the application of the anti-skid chain to a tire with a minimum of effort as the securing latch hooks are firmly held in a position at the sides of the tire casing where it is possible to connect the free ends of the side chains thereto with one hand only instead of having to reach with both hands to the inner side of the tire to connect the ends of the inner side chain as is required in the operation of applying conventional anti-skid chains.

Other advantages of the present invention reside in the placement of the loops 29 between the inner sides of the bodies of the latch hooks and the tire casing so that they are effectively protected from road damage; in the spacing of the hook from the side wall of the tire by the loops 29 facilitating the attachment of the free ends of the side chains to the hooks; in the provision of means for holding surplus chain links to prevent the same from flapping; and in the use of the same latch hook or same form of latch hook on both side chains.

I claim:

1. In a vehicle tire anti-skid chain embodying side chains and cross connecting chains, duplicate latch hooks of the type comprising a flat plate body having a hook bill on one end and a pivoted locking lever on the other end, each latch hook being attached to one end of a side chain for connection by its hook bill with the other end thereof, an applier comprising a substantially U-shaped member designed to straddle the tire and having resilient side arms between which the tire is gripped, and means forming a part of the plate body of each latch hook for detachable connection with a terminal portion of a side arm whereby the latch hooks are maintained in their working positions at the sides of the tire while the said other ends of the side chains are coupled thereto.

2. In a vehicle tire anti-skid chain embodying side chains and cross connecting chains, a latch hook attached to one end of each side chain for connection with the other end thereof, each latch hook comprising an elongate body having a hook bill at one end and having a latching finger pivoted to the other end for engagement across the hook bill, an applier comprising a substantially U-shaped member designed to straddle the tire and having resilient side arms between which the tire is gripped, and an eye carried by and on the tire side of the body of each latch hook formed to slidably receive an end of a coacting side arm, said resilient side arms functioning to hold the latch hooks in their working positions for facilitating the connection thereto of a link of the said other end of the side chain and said eyes providing stand-off means spacing the hook body from the adjacent side of the tire.

3. In a vehicle tire anti-skid chain embodying side chains and cross connecting chains, a latch hook attached to one end of each side chain, said latch hook comprising an elongate body to one end of which the said one end of a side chain is connected and a hook bill at the other end for engagement in a link at the other end of the side chain and a pivoted latch for closing the hook, an applier for the anti-skid chain comprising a substantially U-shaped resilient member formed to straddle the tire and having side legs for extension across and gripping the sides of the tire, and means for detachably slidably receiving and coupling a terminal portion of each of said legs with the said elongate body of an adjacent latch hook between the body and the tire for temporarily maintaining the latch hooks in working position until a link at the other end of the side chain is engaged with the hook bill.

4. The invention according to claim 3, wherein said means is formed to maintain the body of the latch hook in stand-off position relative to the adjacent side of the tire.

5. The invention according to claim 3, wherein the hook bill has a free end portion disposed in outwardly spaced relation with a longitudinal edge of the body, the body at the root portion of the hook bill having a link receiving gullet terminating at said longitudinal edge of the body in a finger directed into the crook of the hook, said gullet functioning in the use of the latch-hook to hold an unused side chain terminal link with a secured link.

6. In a vehicle tire anti-skid chain embodying side chains and cross connecting chains, a latch hook attached to one end of each side chain, said latch hook comprising an elongate body to one end of which the said one end of a side chain is connected and a hook bill at the other end for engagement in a link at the other end of the side chain and a latch for closing the hook, an applier for the anti-skid chain comprising a substantially U-shaped resilient member formed to straddle the tire and having side legs for extension across and gripping the sides of the tire, each of said legs carrying a stop inwardly of the free end thereof, the portion of each leg between the stop and said free end being straight, and means for detachably connecting the said portion of each leg with an adjacent latch hook body between the hook body and the tire comprising an eye carried by the hook body on the side thereof adjacent to the tire and into which the said straight portion of the leg extends, the stop limiting the extension of the leg portion through the eye.

7. In a vehicle tire anti-skid chain of the type having side chains and short cross connecting chains between the side chains, a latch hook attached to one end of each side chain for coupling said one end thereof with the other end of the same chain, the hook including an elongate flat body having a gooseneck bill at one end and a pivoted latch finger at the other end for coaction with the bill to close the hook, said hook body having a gullet in the gooseneck bill end thereof for receiving the other end of said side chain and a surplus tire chain link, a substantially U-shaped resilient metal rod chain applier formed to straddle the tire tread and grip the sides of the tire to maintain its position thereon, and an eye on the tire side of each hook body for slidably receiving an end of the U-shaped metal rod chain applier whereby said applier holds the eyes of the hooks under pressure against the side wall of the tire while the said other end of the adjacent side chain and surplus links are placed in position to be locked in the said gullet of the hook, said eyes of the hook bodies being retained in protected position between the hook bodies and the wall of the tire after the applier is removed and while the chain is in use.

8. The invention according to claim 7, wherein the said eye of each flat hook body comprises a struck-out portion of the flat body.

9. In a vehicle tire anti-skid chain embodying side chains and cross connecting chains, a latch hook attached to one end of each side chain, said latch hook comprising an elongate body to one end of which the said one end of a side chain is connected and a hook bill at the other end for engagement in a link at the other end of the side chain and a pivoted latch for closing the hook, an applier for the anti-skid chain comprising a substantially U-shaped resilient member formed to straddle the tire and having side legs for extension across and gripping the sides of the tire, and means for detachably coupling an end portion of each of said legs with the said elongate body of an adjacent latch hook between the body and the tire for temporarily maintaining the latch hooks in working position until a link at the other end of the side chain is engaged with the hook bill, the said means embodying an eye member carried by the latch hook body and extending from the side thereof adjacent to the tire for contact with the tire and through which eye the said end portion of the adjacent applier leg extends.

References Cited in the file of this patent

UNITED STATES PATENTS

| 1,441,113 | Pepper | Jan. 2, 1923 |
| 1,680,475 | Power | Aug. 14, 1928 |
| 1,806,840 | Campbell | May 26, 1931 |
| 2,478,335 | Stark | Aug. 9, 1949 |